Sept. 28, 1965   G. FOUNTAIN   3,208,384
ROCKET THRUST NEUTRALIZER
Original Filed June 29, 1960

INVENTOR.
GILBERT FOUNTAIN
BY
*P. H. Fisht*
ATTORNEY.

United States Patent Office 3,208,384
Patented Sept. 28, 1965

3,208,384
ROCKET THRUST NEUTRALIZER
Gilbert Fountain, China Lake, Calif., assignor to the United States of America as represented by the Secretary of the Navy
Continuation of application Ser. No. 39,742, June 29, 1960. This application Jan. 21, 1964, Ser. No. 339,574
2 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This is a continuation of United States patent application Ser. No. 39,742, filed June 29, 1960, for Rocket Thrust Neutralizer, now abandoned.

The present invention relates to safety apparatus for protection of aircraft or the like which carry rockets; and more particularly to the type of non-propulsion attachment shown and described in U.S. Patents No. 2,866,314, issued Dec. 30, 1958 to C. R. Roquemore and No. 2,804,822, issued Sept. 3, 1957 to H. A. Meneghelli.

In the interest of safety, it is the practice to provide on rockets a removable attachment of the type disclosed in the aforementioned patents which renders the rocket non-propulsive until the attachment is removed. In some cases it is also the practice to keep the attachment on the rocket even after the rocket has been mounted on the aircraft for launching; the attachment then being removed prior to dispatch of the aircraft on a firing mission. However, firing of the rocket while mounted on the aircraft and with the attachment inadvertently left on creates an extremely dangerous situation inasmuch as the hot gases deflected radially of the rocket of the attachment may then impinge upon structural portions of the aircraft leading to damage or destruction thereof.

It is therefore an object of the present invention to provide a removable attachment for a rocket which not only renders the rocket non-propulsive but also has means for protecting the carrying aircraft against the blast of the hot rocket gases.

A further object is to provide a shield on a non-propulsive attachment for a rocket for the purpose of deflecting the hot thrust gases into fore and aft directions without changing the thrust nullifying feature of the attachment.

A feature of the present invention is the provision of cup-shaped means on a rocket for diverting laterally the hot thrust gases of the rocket and a blast shield circumferentially of the cup-shaped means for deflecting said hot gases in fore and aft directions with substantially equal flow of the gases in said directions to the end that the thrust vectors of the gases balance and cancel out.

Other objects, advantages and novel features of the invention will become apparent from the following detailed description of the invention when considered in conjunction with the accompanying drawings wherein.

Figure 1:
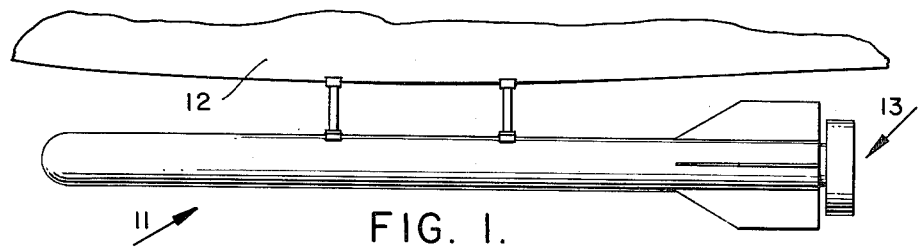
FIG. 1 is a fragmentary schematic view illustrating the relationship between the rocket and the carrying aircraft.

Referring now to the drawings, wherein like numerals refer to like parts throughout the several views, in FIG. 1 is shown a rocket 11 mounted for launching on a structural portion 12 of a carrying aircraft in a conventional manner. Removably attached to the rocket 11 is an attachment 13 which forms the subject of the present invention.

Figure 2:
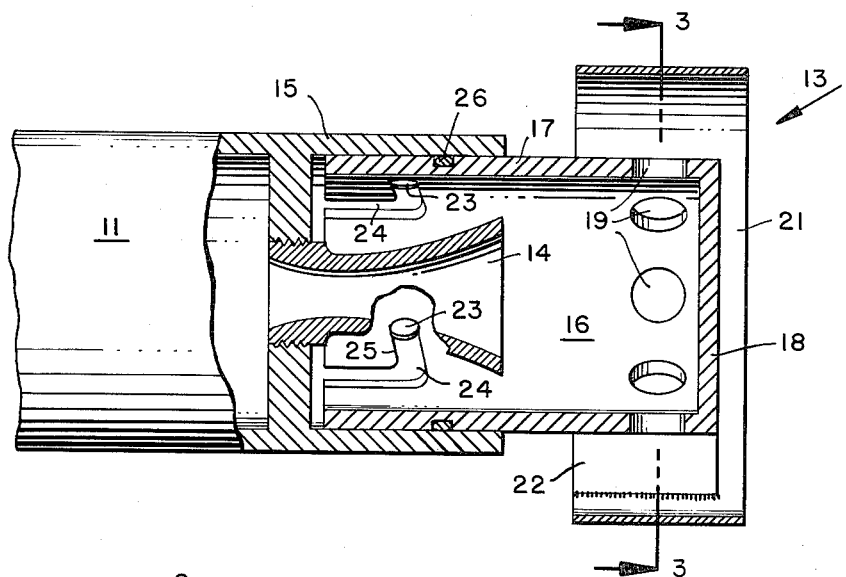
FIG. 2 is a larger scale fragmentary view, partly in section, of the rear end of the rocket and the attachment secured thereto, the section of the attachment being taken generally along line 2—2 of FIG. 3.
Figure 3:
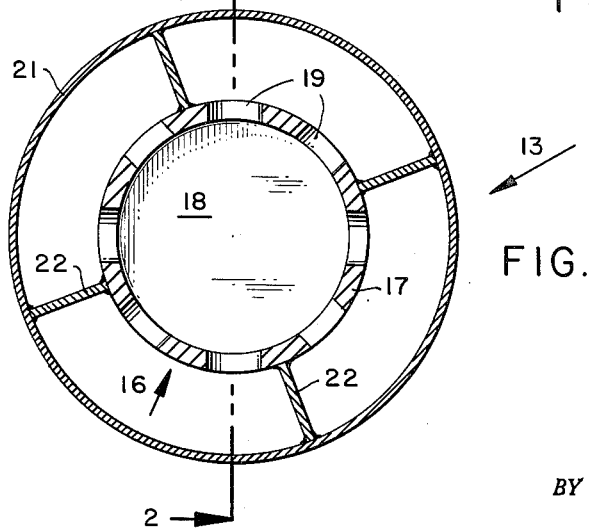
FIG. 3 is a sectional view taken generally along line 3—3 of FIG. 2.

Viewing FIG. 2, rocket 11 may be any conventional type which for simplicity is illustrated as having a single nozzle 14 surrounded by a cylindrical wall 15. The attachment 13 comprises a metallic cup-shaped member 16 having a cylindrical wall 17 and an end wall 18. Near end wall 18 there is formed in wall 17 a plurality of exit ports or openings 19. Disposed about member 16 in the vicinity of openings 19 is a blast shield in the form of a metallic cylinder 21 secured to member 16 by means of plates 22, or the like.

Attachment 13 is attached to rocket 11 by fitting wall 17 to the cylindrical wall 15 on the rear end of the rocket. The attachment may be held to the rocket by means of a plurality of studs 23, or the like, secured to wall 15 and engaged by wall 17 through the medium of bayonet slots 24 in wall 17. Each bayonet slot 24 is formed with an inner sloping portion 25 which slopes away from end wall 18. The purpose of this sloping portion 25 is to lock the attachment to the rocket by operation of the motor. This is, should the attachment be connected so each stud 23 is in contact with its associated portion 25 but not completely home in the bayonet slot, the pressure of the nozzle jet would cause slight rearward movement of the attachment and consequent rotation of the attachment by the camming action between stud 23 and portion 25 until each stud 23 is completely home in its slot 24.

Alternatively, the attachment may be attached by threaded engagement between walls 15 and 17. Also, wall 17 in some cases may be threadedly connected to nozzle 14. If desired, an O-ring 26 may be employed for gas flow obturation when wall 15 is made of a low-heat resistant material such as aluminum.

An important feature of the present invention is the relationship of the blast shield cylinder 21 to the openings 19. It will be noted that openings 19 are so arranged that for each opening there is a diametrically opposite opening of equal dimensions. Also, the openings are so located relative to each other that the central axes of the openings lie generally in a plane disposed substantially perpendicular to the longitudinal axis of the rocket. A further relationship to be noted is that the aforesaid plane is generally along section line 3—3 of FIG. 2 and divides cylinder 21 into two shorter cylinders of substantially equal dimensions. That is, the aforementioned plane intersects cylinder 21 substantially midway between the ends thereof. The result is that the hot gaseous thrust jet issuing from nozzle 14 is deflected or diverted by end wall 18 through exit ports 19 and impinges upon the central portion of the cylinder 21 which in turn deflects or diverts the hot gas further in fore and aft directions generally paralleling the longitudinal axis of the rocket. The flow of gas in the fore and aft directions is substantially equal so that the fore and aft thrust vectors balance and the thrust of the nozzle jet is nullified or neutralized.

From the foregoing description it should be clear that in the operation of the thrust nullifying attachment of the present invention, should the rocket motor be inadvertently ignited the thrust thereof will be neutralized and the hot thrust gases thereof diverted in fore and aft directions generally parallel to the rocket so that no damage results to the carrying aircraft. The attachment is thus effective whether the aircraft is aloft or on the ground.

Obviously many modifications and variations of the present invention are possible in light of the above teachings. It is therefore to be understood that within the scope of the appended claims the invention may be practiced otherwise than as specifically described.

What is claimed is:

1. The combination of a rocket and a rocket motor thrust neutralizer attachment, said rocket having nozzle means at the rear end thereof; said attachment comprising:

a cup-shaped member having a cylindrical wall and an end wall, said cylindrical wall having a plurality of openings formed therein adjacent said end wall;

a blast shield in the form of a cylinder open at its ends disposed about said cup-shaped member in the vicinity of said openings;

means mounting said blast shield cylinder on said cup-shaped member;

and means attaching said attachment to said rocket with said nozzle means disposed within said cup-shaped member;

said end wall and openings serving to deflect laterally of the rocket hot thrust gases issuing from said nozzle means, said cylinder serving to deflect in fore and aft directions the hot thrust gases exiting through said openings, said openings being arranged symmetrically around said cylindrical wall and with the central axes of said openings being disposed generally in a plane substantially perpendicular to the central axis of said cylindrical wall, and said blast shield cylinder being so disposed that said plane intersects said cylinder substantially midway of the ends thereof; whereby hot thrust gases issuing from said nozzle means are first deflected laterally of said rocket and then in fore and aft directions generally parallel to said rocket with substantially equal flow in each of said directions.

2. A thrust neutralizing device for a rocket having a nozzle at its aft end through which hot thrust gases issue for propulsion of the rocket, said device comprising:

cup-shaped means surrounding said nozzle and having a plurality of laterally directed openings for diverting laterally said gases, said openings having central axes lying generally in a plane; and a tubular blast shield disposed about said openings such that said plane intersects said shield substantially midway of the ends thereof for further diverting said gases substantially equally in fore and aft directions and rendering said rocket non-propulsive.

References Cited by the Examiner

UNITED STATES PATENTS 2,804,822  9/57  Meneghelli _____ 102—49
2,916,969  12/59  Pion _____ 89—1.7

BENJAMIN A. BORCHELT, *Primary Examiner.*

SAMUEL FEINBERG, *Examiner.*